(12) United States Patent
Woo

(10) Patent No.: US 8,779,913 B2
(45) Date of Patent: Jul. 15, 2014

(54) TRANSMISSION INDICATOR FOR VEHICLE

(75) Inventor: Jung Hoon Woo, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 295 days.

(21) Appl. No.: 13/288,651

(22) Filed: Nov. 3, 2011

(65) Prior Publication Data

US 2012/0218097 A1 Aug. 30, 2012

(30) Foreign Application Priority Data

Feb. 28, 2011 (KR) .................. 10-2011-0017514

(51) Int. Cl.
  *B60Q 1/00* (2006.01)
  *B60K 35/00* (2006.01)
  *F16H 63/42* (2006.01)
  *G01D 11/28* (2006.01)

(52) U.S. Cl.
  CPC .......... *F16H 63/42* (2013.01); *B60K 2350/203* (2013.01); *B60K 35/00* (2013.01); *B60K 2350/2008* (2013.01); *F16H 2063/423* (2013.01)
  USPC .................. 340/456; 116/28.1; 362/23.19

(58) Field of Classification Search
  USPC .................. 340/456; 116/28.1; 362/23.19
  See application file for complete search history.

(56) References Cited

U.S. PATENT DOCUMENTS

| | | | | |
|---|---|---|---|---|
| 5,245,313 | A * | 9/1993 | Polityka | 340/456 |
| 6,595,575 | B2 * | 7/2003 | Morris | 296/136.02 |
| 6,666,107 | B2 * | 12/2003 | Kim | 74/566 |
| 7,387,418 | B2 * | 6/2008 | Gandorfer | 362/551 |
| 7,943,876 | B2 * | 5/2011 | Kim et al. | 200/310 |
| 8,198,805 | B2 * | 6/2012 | Takagi et al. | 313/506 |
| 2007/0152554 | A1 * | 7/2007 | Kim et al. | 313/112 |
| 2008/0284942 | A1 * | 11/2008 | Mahama et al. | 349/64 |
| 2009/0096900 | A1 * | 4/2009 | Pang et al. | 348/294 |
| 2009/0153543 | A1 * | 6/2009 | Sasaki et al. | 345/214 |
| 2010/0149788 | A1 * | 6/2010 | Kim et al. | 362/97.2 |

* cited by examiner

*Primary Examiner* — Jennifer Mehmood
*Assistant Examiner* — Omar Casillashernandez
(74) *Attorney, Agent, or Firm* — Morgan, Lewis & Bockius LLP

(57) ABSTRACT

A transmission indicator apparatus for a vehicle, may include a base provided on a side of a gearshift lever of the vehicle, a PCB (Printed Circuit Board) circuit mounted on the base and provided with light sources, a cover provided above the PCB circuit to shield an internal structure therein, wherein stage characters of a stage character part and stage selection displays of a stage selection part may be formed on the cover to transmit light of the light sources and be thus distinguished, and a partition provided in a space between the PCB circuit and the cover and located between the stage character part and the stage selection part of the cover, thus preventing light interference between the light sources.

15 Claims, 6 Drawing Sheets

TRANSMISSION INDICATOR FOR VEHICLE

CROSS-REFERENCE TO RELATED APPLICATIONS

The present application claims priority to Korean Patent Application No. 10-2011-0017514 filed on Feb. 28, 2011, the entire contents of which is incorporated herein for purposes by this reference.

BACKGROUND OF THE INVENTION

1. Field of the Invention

The present invention relates generally to a transmission indicator for a vehicle, which is provided on a side of a gearshift lever of a vehicle, thus indicating to a user the current position of a transmission.

2. Description of Related Art

Generally, a transmission indicator is provided on a cluster gate or a console upper cover in a vehicle to indicate the current position of the transmission of the vehicle. A driver can see the current position of the transmission through the transmission indicator. An automatic transmission is generally indicated in "P" (park), "R" (reverse), "N" (neutral), "D" (drive), "+" (stage up), and "−" (stage down). The transmission indicator is configured so that the above characters emit light.

Particularly in the daytime, even if the characters of the transmission indicator do not emit light, a driver can easily recognize the current position of the transmission based on the position of a gearshift lever as long as the gearshift lever is arranged to be parallel to a selected stage character. However, at night, the characters of P, R, N, D, +, and −emit light to allow a driver to distinguish the current position of the transmission. Furthermore, a stage selection part is provided to indicate the current gear position, and emits light, thus affording convenience to a driver.

Therefore, vehicle manufacturers should install light emitting parts at a stage character part and the stage selection part so as to make both the stage character part and the stage selection part emit light, thus making it more complicated to manufacture the transmission indicator. Of course, the stage selection part may be included in the transmission indicator or may be provided separately from the transmission indicator. According to a conventional indicator shown in the drawings, the stage selection part is included in the transmission indicator, so that the stage character part and the stage selection part are placed together on the transmission indicator.

FIG. 1 is a perspective view showing a conventional transmission indicator for a vehicle, and FIG. 2 is a perspective view showing a PCB of the transmission indicator for the vehicle shown in FIG. 1.

As shown in the drawings, the conventional transmission indicator for the vehicle includes a cover 10 and a stage character part 20 which is marked on the cover 10 and includes stage characters P, R, N, D, +, and −. The stage character part 20 always emits light during day and night, and a selected stage emits light with a different color to allow a user to distinguish the selected stage of the transmission during day and night. To this end, as shown in FIG. 2, the PCB circuit 30 is configured so that each stage character has two light emitting parts 41a and 41b, 42a and 42b, 43a and 43b, 44a and 44b, 45a and 45b, or 46a and 46b. The reason why such a configuration is required is because six light emitting parts for indicating the stage characters and six light emitting parts having different colors for indicating stage selection displays corresponding to the respective stage characters are needed.

That is, the conventional transmission indicator for the vehicle is problematic in that at least two light emitting parts are needed per stage character, so that light emitting parts 12 are required as for the embodiment shown in the drawings, and thus manufacturing costs are increased and the excessive volume of the PCB imposes restrictions on design. According to the recent trends in design, the size of the transmission indicator is minimized, so that the remaining space is utilized as a cup holder or storage space. Thus, in order to attain the positional perceptibility of the transmission when the size of the transmission indicator for the vehicle is minimized, distinguishable light emitting parts are needed for respective stages. However, in order to afford designing freedom, the number of light emitting parts must be reduced and the PCB must be simplified.

Further, the conventional transmission indicator is generally configured so that the cover and the stage characters of the stage character part are separately manufactured, and the stage character part is assembled with the cover by fitting. In this case, water passes through a gap between the cover and the stage character part, so the PCB circuit in the transmission indicator may be damaged. Further, in the case of separately manufacturing the stage selection part, both the stage character part and the stage selection part are present in the cover of the transmission indicator, and design is thus complicated.

It is to be understood that the foregoing description merely aids in understanding the present invention, and does not mean that the present invention falls under the purview of the related art which was already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission indicator for a vehicle, which is simple in design, has improved resistance to the permeation of water, and reduces the number of light emitting parts, thus reducing manufacturing costs.

In an aspect of the present invention, the transmission indicator apparatus for a vehicle, may include a base provided on a side of a gearshift lever of the vehicle, a PCB (Printed Circuit Board) circuit mounted on the base and provided with light sources, a cover provided above the PCB circuit to shield an internal structure therein, wherein stage characters of a stage character part and stage selection displays of a stage selection part are formed on the cover to transmit light of the light sources and be thus distinguished, and a partition provided in a space between the PCB circuit and the cover and located between the stage character part and the stage selection part of the cover, thus preventing light interference between the light sources.

The cover is formed to be opaque, thus shielding the PCB circuit, and the stage characters of the stage character part and the stage selection displays of the stage selection part are formed to be semitransparent, thus allowing the stage characters and the stage selection displays to be distinguished when the light sources emit light.

The stage selection displays of the cover are formed to be semitransparent, thus shielding the PCB circuit at normal times, and being distinguishable by the light sources when the light sources emit light.

The cover may include a panel part made of a transparent material, a semitransparent paint layer superposed on the panel part, and a black paint layer superposed on the semitransparent paint layer.

The stage characters of the stage character part are formed by laser cutting the black paint layer according to the shape of the stage characters.

Each of the stage selection displays of the stage selection part of the cover is formed by laser cutting the black paint layer according to a shape of the stage selection display and applying semitransparent smog paint to a cut part.

Each of the stage selection displays of the stage selection part of the cover is formed by laser cutting the black paint layer and the semitransparent white paint layer according to a shape of the stage selection display and applying semitransparent smog paint to a cut part.

The panel part of the cover may have a serrated part on a lower surface thereof at which the stage selection displays are located wherein one of the light sources is disposed under the serrated part.

The light sources are placed, respectively, under the stage character part and the stage selection part, and the partition is placed to separate the stage character part from the stage selection part.

The light sources are placed, respectively, under the stage selection displays of the stage selection part, and the partition is placed between the stage character part and the stage selection part and between the stage selection displays of the stage selection part.

The partition may include a main part longitudinally provided between the stage character part and the stage selection part, and a plurality of rib parts extending laterally from the main part to be placed between the stage selection displays of the stage selection part.

A light guide plate is provided between the PCB circuit and the stage character part of the cover, one of the light sources is provided on a side of the PCB circuit, and the stage characters of the stage character part are distinguishable by light reflection of the light guide plate when the one of the light sources emits light.

Dot-shaped light diffusing ink is printed on a surface of the light guide plate to form the stage characters.

The dot-shaped light diffusing ink is printed on a lower surface of the light guide plate to form the stage characters and a light diffusing sheet is attached to the lower surface of the light guide sheet to reflect light.

The light diffusing ink is divided into sections depending on a distance to the one of the light sources, and luminance of the ink is increased as the distance from each of the sections to the one of the light sources increases.

The light diffusing ink is divided into sections depending on a distance to the one of the light sources, and a distance between dots is reduced as the distance from each of the sections to the one of the light sources increases.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
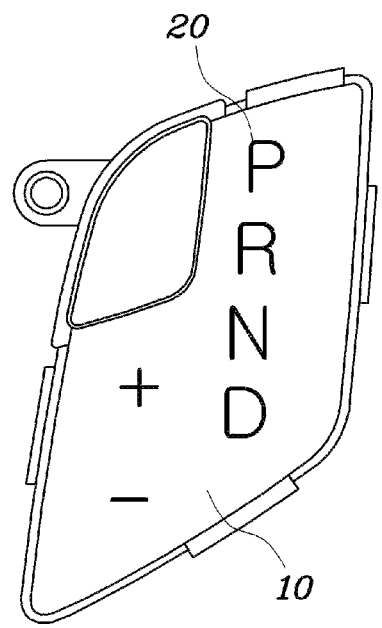
FIG. 1 is a perspective view showing a conventional transmission indicator for a vehicle.
Figure 2:
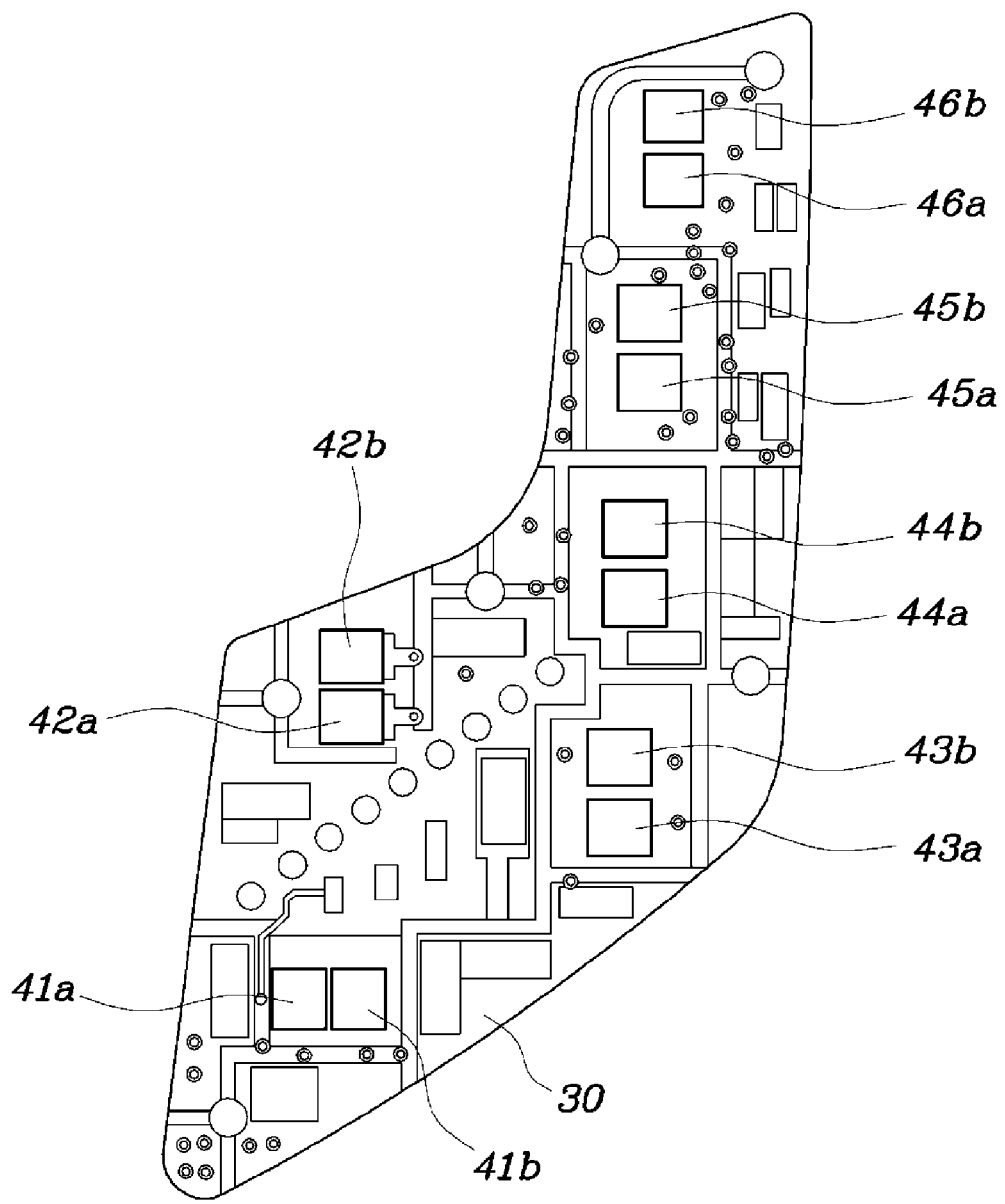
FIG. 2 is a perspective view showing a PCB circuit of the transmission indicator for the vehicle shown in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a transmission indicator for a vehicle according to the exemplary embodiment of the present invention will be described with reference to the accompanying drawings.

Figure 3:
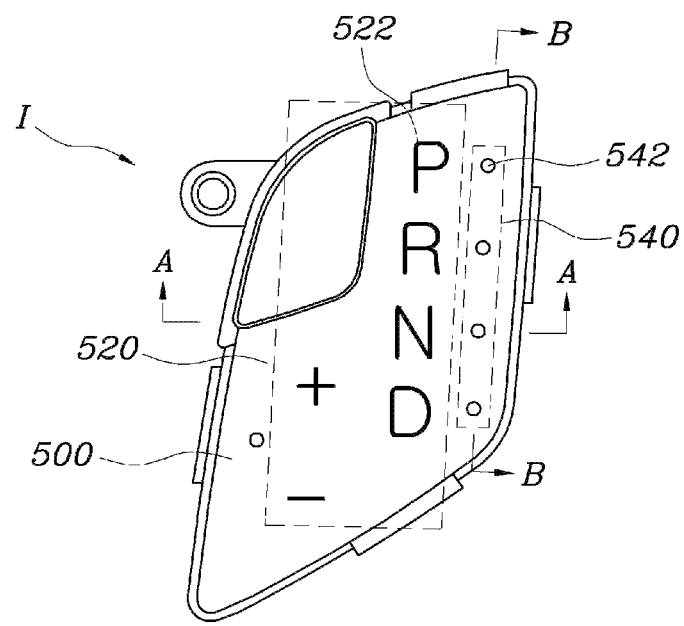
FIG. 3 is a perspective view showing a transmission indicator for a vehicle according to an exemplary embodiment of the present invention.
Figure 4:
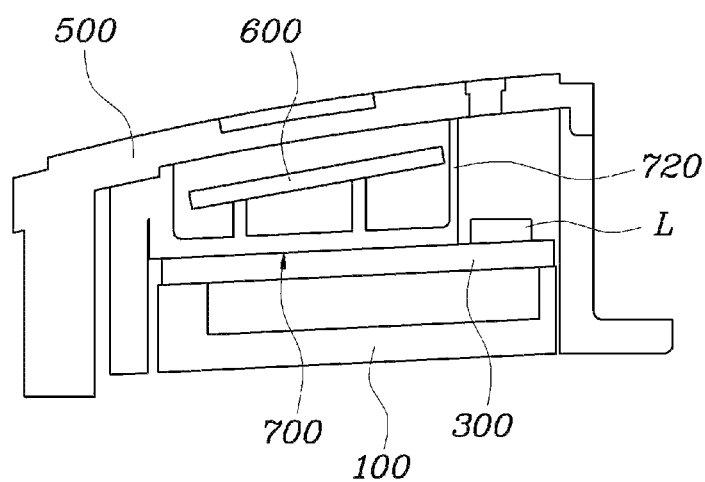
FIG. 4 is a sectional view taken along line A-A of FIG. 3 showing the transmission indicator for the vehicle.
Figure 5:
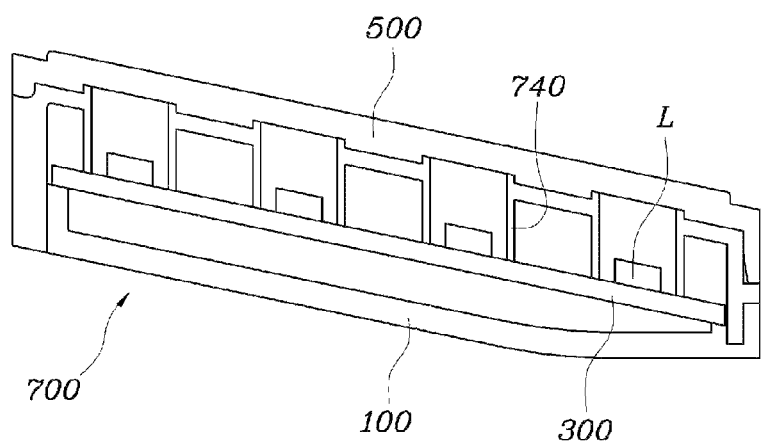
FIG. 5 is a sectional view taken along line B-B of FIG. 3 showing the transmission indicator for the vehicle.

FIG. 3 is a perspective view showing a transmission indicator for a vehicle according to an exemplary embodiment of the present invention, FIG. 4 is a sectional view taken along line A-A of FIG. 3 showing the transmission indicator for the vehicle, and FIG. 5 is a sectional view taken along line B-B of FIG. 3 showing the transmission indicator for the vehicle.

The transmission indicator for the vehicle according to the exemplary embodiment of the present invention includes a base 100, a PCB circuit 300, a cover 500, and a partition 700. The base 100 is provided on a side of a gearshift lever of the vehicle. The PCB circuit 300 is mounted on the base 100 and is provided with light sources L. The cover 500 is provided above the PCB circuit 300 to cover an internal structure, and stage characters 522 of a stage character part 520 and stage selection displays 542 of a stage selection part 540 are formed on the cover 500 to transmit the light of the light sources L and be thus distinguished. The partition 700 is provided in a space between the PCB circuit 300 and the cover 500, and is located between the stage character part 520 and the stage selection part 540 of the cover 500, thus preventing the light interference between the light sources L.

The base 100 may be installed in a space which is formed around the gearshift lever of the vehicle. The PCB circuit 300 is mounted on the base 100. The PCB circuit 300 is provided with the light sources L, thus allowing the stage characters 522 or the stage selection displays 542 of the transmission indicator to be distinguished even at night. The cover 500 is coupled to the upper portion of the PCB circuit 300. The cover 500 may be formed into an integrated structure using a plastic material, and defines the exterior of the transmission indicator.

Such a cover 500 is divided into the stage character part 520 and the stage selection part 540. The stage character part 520 includes the stage characters 522, for example, P, R, N, D, +, and −, and the stage selection part 540 includes the stage selection displays 542 which are provided to correspond to the respective stage characters 522 and indicate that an associated stage character 522 is selected. The stage character part 520 and the stage selection part 540 are integrated with the cover 500 into a single structure, thus completely preventing the permeation of water.

Meanwhile, the partition 700 is provided between the cover 500 and the PCB circuit 300 of the transmission indicator. The partition 700 is located between the stage character part 520 and the stage selection part 540, thus preventing light interference between the light source of the stage character part 520 and the light source of the stage selection part 540. Thereby, the stage character part 520 and the stage selection part 540 may independently emit light. Further, interference between the stage character part 520 and the stage selection part 540 is eliminated, thus enabling light to be emitted uniformly and evenly, therefore increasing the marketability of a product.

In detail, as shown in FIG. 4, the base 100 is provided on the bottom of the indicator, and the PCB circuit 300 is mounted on the base 100. The cover 500 is provided above the PCB circuit 300. The cover 500 is divided into the stage character part 520 and the stage selection part 540. The stage character part 520 is provided with the light source (see FIG. 7) and a light guide plate 600, thus allowing the entire stage character part 520 to emit light with a single light source. The stage selection part 540 is also provided with the light source, thus allowing an associated stage selection display 542 to emit light when a stage is selected. In order to independently emit light from the stage character part 520 and the stage selection part 540, the partition 700 is provided between the stage character part 520 and the stage selection part 540.

The light sources L are placed, respectively, on the stage character part 520 and the stage selection part 540, and the partition 700 is placed to separate the stage character part 520 from the stage selection part 540. Preferably, the light sources L of the stage selection part 540 may be placed, respectively, on the stage selection displays 542 of the stage selection part 540, and the partition 700 may be placed between the stage character part 520 and the stage selection part 540 and between the stage selection displays 542 of the stage selection part 540. In this case, the stage character part 520 and the stage selection part 540 are basically separated from each other, and the stage selection displays 542 of the stage selection part 540 are also separated from each other, so that the entirety of the stage character part 520 emits light, and a stage selection display 542 corresponding to the selected stage character emits light when a stage is selected.

Meanwhile, the partition 700 may include a main part 720 which is longitudinally provided between the stage character part 520 and the stage selection part 540, and a plurality of rib parts 740 which extend laterally from the main part 720 to be placed between the stage selection displays 542 of the stage selection part 540.

The cover 500 is formed to be opaque, thus shielding the PCB circuit 300. The stage characters 522 of the stage character part 520 and the stage selection displays 542 of the stage selection part 540 are formed to be semitransparent, thus allowing the stage characters 522 and the stage selection displays 542 to be distinguished when the light sources L emit light. This is made by the following methods. That is, after portions of the cover 500 corresponding to the stage characters 522 and the stage selection displays 542 are cut by laser, a semitransparent paint layer may be applied. Alternatively, when the cover 500 is formed, the whole cover 500 may be treated to be opaque and the stage characters 522 and the stage selection displays 542 may be formed to be semitransparent. Here, the cover 500 is formed of an integrated panel.

In detail, the stage selection displays 542 of the cover 500 are formed to be semitransparent, thus shielding the PCB circuit 300 at normal times, and being distinguished by the light sources L when the light sources L emit light. That is, the stage selection displays 542 are treated to be semitransparent, so that the stage selection displays 542 are not seen in a visible area at normal times. To this end, it is necessary to provide a depth between the cover 500 and the PCB circuit 300. Further, since the stage selection displays 542 are treated to be semitransparent, they are not seen at normal times and are seen when the light sources L emit light. The partition 700 prevents an adjacent stage selection display from being seen.

Figure 6:
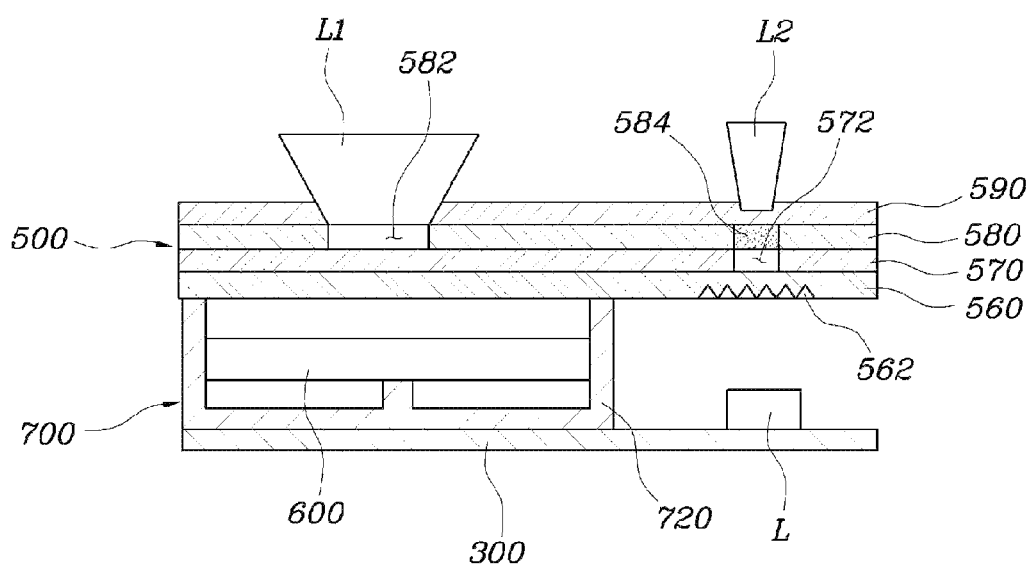
FIG. 6 is a detailed sectional view showing the transmission indicator for the vehicle of FIG. 3.

FIG. 6 is a detailed sectional view showing the transmission indicator for the vehicle of FIG. 3. The cover 500 includes a panel part 560 which is made of a transparent material, a semitransparent paint layer 570 which is superposed on the panel part 560, and a black paint layer 580 which is superposed on the semitransparent paint layer 570. The stage characters 522 of the stage character part 520 may be formed by laser cutting the black paint layer 580 according to the shape of the stage characters 522. The cover 500 includes the panel part 560 which is made of the transparent material, thus allowing light to be transmitted from the light sources L provided at a lower position to the panel part 560. The black paint layer 580 is the opaque paint to block the light. Thus, the cover 500 functions to shield the internal structure thereunder. Further, the semitransparent paint layer 570 is the semitransparent paint with white or various colors. Thus, the semitransparent paint layer 570 is expressed with the color of the paint and shields the internal structure at normal times, whereas it transmits light in the color of the paint when light is emitted.

The stage characters 522 are formed in parts 582 which are cut by laser cutting the black paint layer 580 according to the shape of characters. Thereby, when light is transmitted from the PCB circuit 300 provided at the lower position, the semitransparent paint layer 570 transmits the light, so that each stage character 522 emits light with an associated color.

Each stage selection display 542 of the stage selection part 540 of the cover 500 is formed by laser cutting the black paint layer 580 according to the shape of the stage selection display 542 and applying semitransparent smog paint 584 to a cut part. The semitransparent smog paint 584 is the paint which is obtained by reducing the density of black paint or is dark gray color and prevents the internal structure from being easily exposed as long as very strong light is not radiated. Thereby, the semitransparent smog paint 584 prevents the internal structure from being seen by normal light, thus generating a ghost effect as if the stage selection displays 542 were not present, and allows the stage selection displays 542 to transmit light and thus be seen only when the light sources L of the PCB circuit 300 provided at the lower position emit light, thus improving design and marketability.

Further, each stage selection display 542 of the stage selection part 540 of the cover 500 may be formed by laser cutting the black paint layer 580 and the semitransparent white paint layer 570 according to the shape of the stage selection display 542 and applying semitransparent smog paint to a cut part 572. Accordingly, the stage selection displays 542 may be constructed so that they are not seen at normal times as if they were not present, and are distinguishable only when light is emitted.

Meanwhile, the panel part 560 of the cover 500 has a serrated part 562 on a lower surface thereof at which the stage selection displays 542 are located, thus evenly dispersing the light of the light sources L provided at the lower position throughout the stage selection displays 542, therefore preventing glare and allowing soft light to be emitted.

The uppermost end of the cover 500 is coated with a high glossy coating layer 590, so that the cover 500 is finished.

Figure 7:
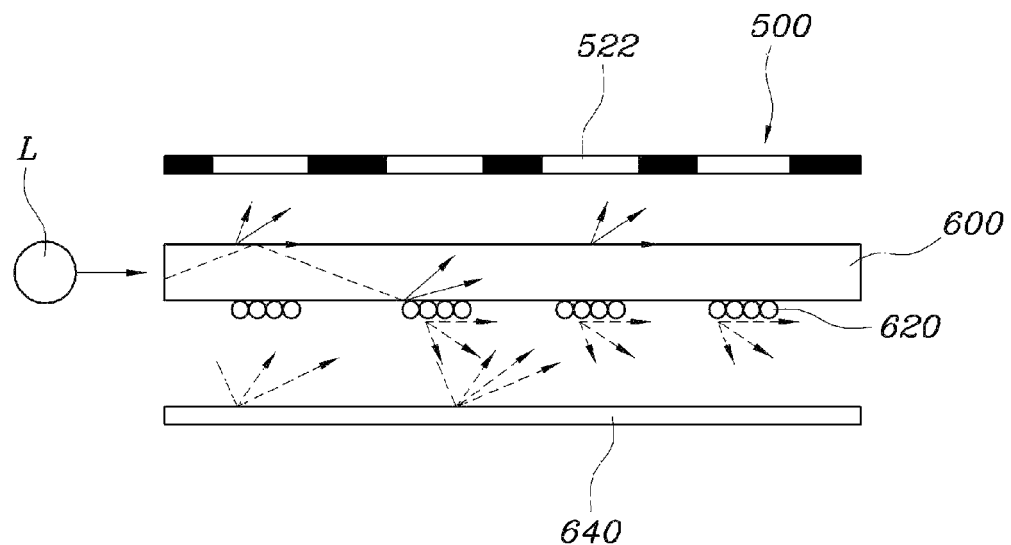
FIG. 7 is a view illustrating the light emitting principle of the transmission indicator for the vehicle of FIG. 3.
Figure 8:
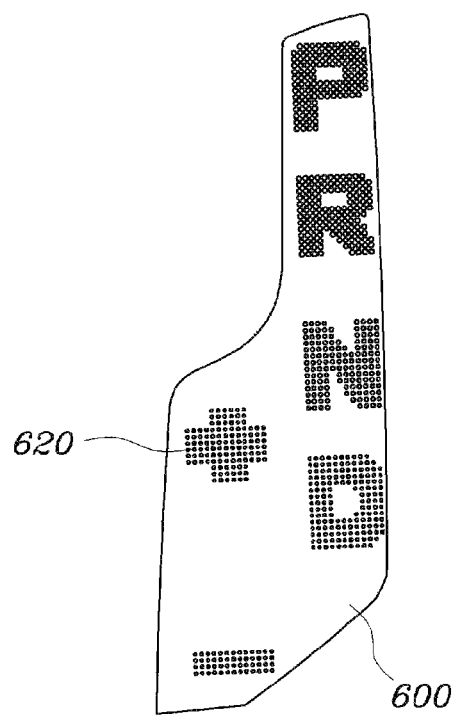
FIG. 8 is a view showing a light guide plate of the transmission indicator for the vehicle of FIG. 3.
Figure 9:
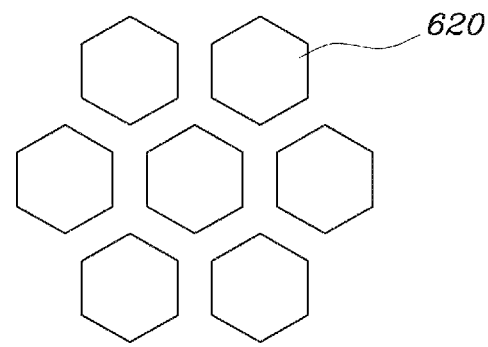
FIGS. 9 and 10 are views showing light diffusing ink of the light guide plate of FIG. 3.
Figure 10:
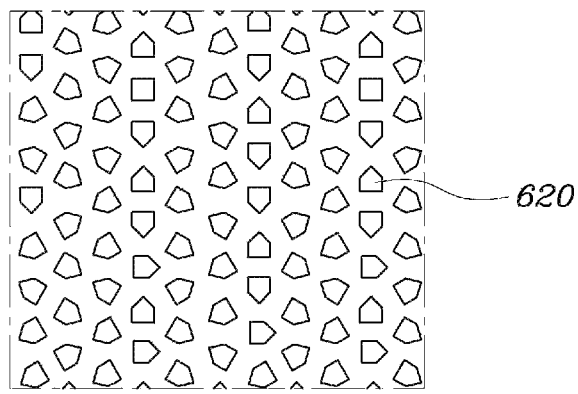
Figure 11:
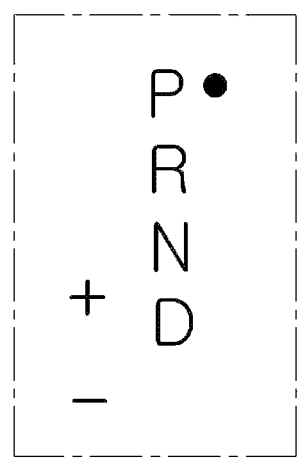
FIG. 11 is a view showing the state in which the transmission indicator for the vehicle of FIG. 3 emits light.

FIG. 7 is a view illustrating the light emitting principle of the transmission indicator for the vehicle of FIG. 3, FIG. 8 is a view showing a light guide plate of the transmission indicator for the vehicle of FIG. 3, FIGS. 9 and 10 are views showing light diffusing ink of the light guide plate of FIG. 3, and FIG. 11 is a view showing the state in which the transmission indicator for the vehicle of FIG. 3 emits light.

The light guide plate 600 is provided between the PCB circuit 300 and the stage character part 520 of the cover 500. The light source L is provided on a side of the PCB circuit 300, and the stage characters 522 of the stage character part 520 are distinguishable by the light reflection of the light guide plate 600 when the light source L emits light. Dot-shaped light diffusing ink 620 is printed on a surface of the light guide plate 600 to form the stage characters 522. The light diffusing ink 620 is divided into sections depending on the distance to the light source L. As the distance from each section to the light source L increases, the luminance of the ink is increased and a distance between dots is reduced.

In detail, the light guide plate 600 is made of a plastic material, and reflects light of the light source L radiated into the light guide plate 600 using irregular reflection. The light diffusing ink 620 is printed on a surface of the light guide plate 600. The light diffusing ink 620 has the shape of dots, and induces irregular reflection by light reflection between the dots, so that the light of the light source L can extend from the rear to the front. Further, a light diffusing sheet 640 is attached to the lower surface of the light guide plate 600. The light diffusing sheet 640 may be painted with white, and serves to reflect light so that it is diffused to the front.

Thus, light generated by an LED installed at the rear is irregularly reflected by the light guide plate 600, the light diffusing ink 620, and the light diffusing sheet 640, and is diffused to the front.

The light source L is preferably installed to radiate light to a side of the light guide plate 600. The reason is because, when the light source L radiates light to a side of the light guide plate 600, the radiated light is diffused to the front while being reflected in the light guide plate 600, and is smoothly reflected relative to the light diffusing ink 620 and the light diffusing sheet 640.

Further, after the light diffusing ink 620 is printed on the lower surface of the light guide plate 600, the light diffusing sheet 640 is attached to the bottom of the light guide plate 600. Thereby, the light of the light source L moves forward while being reflected between the upper and lower ends of the light guide plate 600, and the light which moves downward while being irregularly reflected by the light diffusing ink 620 provided on the lower surface of the light guide plate 600 is reflected upward by the light diffusing sheet 640 again. Therefore, the maximum quantity of light can be radiated to the cover 500 which is provided on the upper end of the light guide plate 600, thus allowing the light source L to be sufficiently efficiently utilized.

Meanwhile, the light diffusing ink 620 is printed on the light guide plate 600 in such a way as to be spaced by a predetermined distance, thus corresponding to the position of each stage character 522 of the stage character part 520. That is, the light diffusing ink 620 is not printed on all portions, but is printed only on a required portion, namely, a portion under the stage character part 520 in the form of dots, thus reducing unnecessary reflection, and allowing light to sufficiently reach a point distant from the light source L. If the light diffusing ink 620 is printed on all portions of the light guide plate 600, all light is reflected at a point near to the light source L, so that a sufficient quantity of light is not radiated to the point distant from the light source L.

Further, the light diffusing ink 620 may be printed in the shape of each stage character included of dots. This is more efficient than the method of printing dots at a position corresponding to each stage character 522, and is printed in the shape corresponding to each stage character, that is, in the shape of the stage character as shown in the drawing, so that it is possible to obtain brighter light at the edge of the stage character 522, and thereby unnecessary reflection is reduced, and the edge of the stage character 522 can be clearly shown.

Meanwhile, the light diffusing ink 620 is divided into sections depending on the distance to the light source L, and the luminance of the ink increases as the distance from each section to the light source L increases. Further, as the distance from each section to the light source L increases, a distance between the ink dots is reduced.

The printed light diffusing ink 620 is divided into sections depending on the distance from the light source L to the light guide plate 600. When the luminance of the ink is changed and the distances between the dots and the patterns thereof are changed for respective sections, a smaller quantity of light is reflected by the dots near to the light source L, so that the intensity of radiated light may become weaker. At a point distant from the light source L, the luminance of the ink is relatively high, and the distance between the dots is short, so that reflection occurs frequently and the intensity of radiated light may become stronger.

Such a structure allows the light of the light source L to be weak at a point near to the light source L and to be strong at a point distant from the light source L, thus allowing the light to be evenly used, and enables the stage character part 520 to be illuminated with a predetermined luminance regardless of the distance.

The light diffusing ink 620 is characterized in that its dot is shaped as a polygonal edge. The light guide plate 600 is mainly divided into third portions. The light guide plate 600 is divided into a first point (+, −), a second point (N, D), and a third point (P, R) depending on the distance between the point and the light source L, and the respective points are different in ink luminance and dot pattern from each other. In detail, the first point is the point which is the nearest to the light source L, is low in ink luminance, has a hexagonal-edge-shaped dot as shown in FIG. 9, and forms a pattern such that a spacing distance between the dots is the largest.

In order to increase luminance from the second to the third point, different kinds of ink are used. As shown in FIG. 10, the second and third points have hexagonal patterns, and are formed such that the distance between the dots is reduced as the distance from the light source L increases. Further, the polygonal dots are not arranged in a row, but are arranged to be offset, thus causing irregular reflection to occur smoothly.

FIG. 11 is a view showing the state in which the transmission indicator for the vehicle of FIG. 3 emits light. Through the change of the luminance and pattern of the light guide plate and the light diffusing ink, the stage character part 520 of the cover 500 may have constant luminance even with a single light source regardless of the distance from the light source. Further, the stage selection part 540 is provided for the stage character part 520, so that the stage selection part 540 is not seen at normal times, and is illuminated by the stage selection displays 542. Consequently, as the number of light sources for radiating six stage characters of P, R, N, D, +, and − is reduced from six to one, the design of the PCB is simple, the volume thereof is reduced, and manufacturing costs are considerably reduced. Further, the design and marketability are improved and the light is blocked by the ghost effect of the stage selection part, so that it is possible to clearly distinguish light emitting parts from each other, and resistance to water permeation is improved owing to the integrated cover.

As described above, the present invention provides a transmission indicator for a vehicle, in which a cover of the transmission indicator has an integrated structure, thus improving resistance to the permeation of water, and a stage selection display of a stage selection part is not seen at normal times and emits light only when a stage is selected, thus affording high visibility.

Further, the present invention provides a transmission indicator for a vehicle, which reduces the number of light emitting parts of a PCB of the transmission indicator, thus reducing manufacturing costs and reducing the volume of the PCB, therefore overcoming restriction on design.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission indicator apparatus for a vehicle, comprising:
    a base provided on a side of a gearshift lever of the vehicle;
    a PCB (Printed Circuit Board) circuit mounted on the base and provided with light sources;
    a cover provided above the PCB circuit to shield an internal structure therein, wherein stage characters of a stage character part and stage selection displays of a stage selection part are formed on the cover to transmit light of the light sources and be thus distinguished; and
    a partition provided in a space between the PCB circuit and the cover and located between the stage character part and the stage selection part of the cover, thus preventing light interference between the light sources,
    wherein a light guide plate is provided between the PCB circuit and the stage character part of the cover, one of the light sources is provided on a side of the PCB circuit, and the stage characters of the stage character part are distinguishable by light reflection of the light guide plate when the one of the light sources emits light,
    wherein dot-shaped light diffusing ink is printed on a surface of the light guide plate to form the stage characters, and
    wherein the light diffusing ink is divided into sections depending on a distance to the one of the light sources, and luminance of the ink is increased as the distance from each of the sections to the one of the light sources increases.

2. The transmission indicator apparatus as set forth in claim 1, wherein the cover is formed to be opaque, thus shielding the PCB circuit, and the stage characters of the stage character part and the stage selection displays of the stage selection part are formed to be semitransparent, thus allowing the stage characters and the stage selection displays to be distinguished when the light sources emit light.

3. The transmission indicator apparatus as set forth in claim 2, wherein the stage selection displays of the cover are formed to be semitransparent, thus shielding the PCB circuit at normal times, and being distinguishable by the light sources when the light sources emit light.

4. The transmission indicator apparatus as set forth in claim 1, wherein the cover comprises:
    a panel part made of a transparent material;
    a semitransparent paint layer superposed on the panel part; and
    a black paint layer superposed on the semitransparent paint layer.

5. The transmission indicator apparatus as set forth in claim 4, wherein the stage characters of the stage character part are formed by laser cutting the black paint layer according to the shape of the stage characters.

6. The transmission indicator apparatus as set forth in claim 4, wherein each of the stage selection displays of the stage selection part of the cover is formed by laser cutting the black paint layer according to a shape of the stage selection display and applying semitransparent smog paint to a cut part.

7. The transmission indicator apparatus as set forth in claim 4, wherein each of the stage selection displays of the stage selection part of the cover is formed by laser cutting the black paint layer and a semitransparent white paint layer according to a shape of the stage selection display and applying semitransparent smog paint to a cut part.

8. The transmission indicator apparatus as set forth in claim 4, wherein the panel part of the cover has a serrated part on a lower surface thereof at which the stage selection displays are located.

9. The transmission indicator apparatus as set forth in claim 8, wherein one of the light sources is disposed under the serrated part.

10. The transmission indicator apparatus as set forth in claim 1, wherein the light sources are placed, respectively, under the stage character part and the stage selection part, and the partition is placed to separate the stage character part from the stage selection part.

11. The transmission indicator apparatus as set forth in claim 10, wherein the light sources are placed, respectively, under the stage selection displays of the stage selection part, and the partition is placed between the stage character part and the stage selection part and between the stage selection displays of the stage selection part.

12. The transmission indicator apparatus as set forth in claim 11, wherein the partition comprises:
- a main part longitudinally provided between the stage character part and the stage selection part; and
- a plurality of rib parts extending laterally from the main part to be placed between the stage selection displays of the stage selection part.

13. The transmission indicator apparatus as set forth in claim 1, wherein the dot-shaped light diffusing ink is printed on a lower surface of the light guide plate to form the stage characters and a light diffusing sheet is attached to the lower surface of the light guide sheet to reflect light.

14. A transmission indicator apparatus for a vehicle, comprising:
- a base provided on a side of a gearshift lever of the vehicle;
- a PCB (Printed Circuit Board) circuit mounted on the base and provided with light sources;
- a cover provided above the PCB circuit to shield an internal structure therein, wherein stage characters of a stage character part and stage selection displays of a stage selection part are formed on the cover to transmit light of the light sources and be thus distinguished; and
- a partition provided in a space between the PCB circuit and the cover and located between the stage character part and the stage selection part of the cover, thus preventing light interference between the light sources, wherein a light guide plate is provided between the PCB circuit and the stage character part of the cover, one of the light sources is provided on a side of the PCB circuit, and the stage characters of the stage character part are distinguishable by light reflection of the light guide plate when the one of the light sources emits light, wherein dot-shaped light diffusing ink is printed on a surface of the light guide plate to form the stage characters, and wherein the light diffusing ink is divided into sections depending on a distance to the one of the light sources, and a distance between dots is reduced as the distance from each of the sections to the one of the light sources increases.

15. The transmission indicator apparatus as set forth in claim 14, wherein a light diffusing sheet is attached to a lower surface of the light guide sheet to reflect light.

* * * * *